US010782726B2

United States Patent
(12) United States Patent
Amir et al.

(10) Patent No.: US 10,782,726 B2
(45) Date of Patent: Sep. 22, 2020

(54) OPTIMIZING CORE UTILIZATION IN NEUROSYNAPTIC SYSTEMS

(71) Applicant: International Business Machines Corporation, Armonk, NY (US)

(72) Inventors: Arnon Amir, Saratoga, CA (US); Pallab Datta, San Jose, CA (US); Nimrod Megiddo, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/373,519

(22) Filed: Apr. 2, 2019

(65) Prior Publication Data

US 2019/0227589 A1 Jul. 25, 2019

Related U.S. Application Data

(63) Continuation of application No. 14/871,680, filed on Sep. 30, 2015, now Pat. No. 10,317,930.

(51) Int. Cl.

| | |
|---|---|
| ***G06E 1/00*** | (2006.01) |
| ***G06N 3/04*** | (2006.01) |
| ***G06N 3/063*** | (2006.01) |
| *G06E 3/00* | (2006.01) |

(52) U.S. Cl.

CPC .............. *G06E 1/00* (2013.01); *G06N 3/049* (2013.01); *G06N 3/063* (2013.01); *G06E 3/00* (2013.01)

(58) Field of Classification Search

CPC . G06E 1/00; G06E 3/00; G06N 3/063; G06N 3/049

See application file for complete search history.

(56) References Cited

U.S. PATENT DOCUMENTS

| | | | | |
|---|---|---|---|---|
| 5,687,286 | A * | 11/1997 | Bar-Yam .................. | G06K 9/62 704/232 |
| 8,990,130 | B2 | 3/2015 | Alvarez-Icaza Rivera et al. | |
| 10,317,930 | B2 | 6/2019 | Amir et al. | |
| 2011/0016071 | A1 | 1/2011 | Guillen et al. | |
| 2014/0180987 | A1 | 6/2014 | Arthur et al. | |
| 2014/0258199 | A1 | 9/2014 | Modha | |
| 2015/0106306 | A1 | 4/2015 | Birdwell et al. | |

(Continued)

OTHER PUBLICATIONS

Bansal et al., "A Tale of Two Dimensional Bin Packing," IEEE, 46th Annual IEEE Symposium on Foundations of Computer Science, Oct. 23-25, 2005, 10 pages.

(Continued)

*Primary Examiner* — Ajay Ojha
(74) *Attorney, Agent, or Firm* — Zilka-Kotab, P.C.

(57) ABSTRACT

In one embodiment, a computer program product for optimizing core utilization in a neurosynaptic network includes a computer readable storage medium having program instructions embodied therewith, where the computer readable storage medium is not a transitory signal per se, and where the program instructions are executable by a processor to cause the processor to perform a method including identifying, by the processor, one or more unused portions of a neurosynaptic network, and for each of the one or more unused portions of the neurosynaptic network, disconnecting, by the processor, the unused portion from the neurosynaptic network.

20 Claims, 11 Drawing Sheets

510 553 556a 556b 556c 552 554

600 612 614 614 614 Core A

(56) References Cited

U.S. PATENT DOCUMENTS

| | | | |
|---|---|---|---|
| 2015/0112911 | A1 | 4/2015 | Jackson et al. |
| 2015/0134583 | A1 | 5/2015 | Tamatsu et al. |
| 2015/0346922 | A1 | 12/2015 | Robertson |
| 2016/0350834 | A1 | 12/2016 | Wilson et al. |
| 2016/0358070 | A1 | 12/2016 | Brothers et al. |
| 2017/0091614 | A1 | 3/2017 | Amir et al. |
| 2018/0189056 | A1 | 7/2018 | Turakhia et al. |

OTHER PUBLICATIONS

Borndorfer et al., "Matrix Decomposition by Branch-and Cut," Technical report SC 97-14, Konrad-Zuse-Zentrum fur Informationstechnik, Berlin, Mar. 1997, pp. 1-10.
Imahori et al., "Practical Algorithms for Two-dimensional Packing," Mathematical Engineering Technical Reports, Mar. 2006, pp. 1-22.
Johnson et al., "Worst-Case Performance Bounds for Simple One-Dimensional Packing Algorithms," SIAM J. Comput. vol. 3 No. 4, Dec. 1974, pp. 299-325.
Lodi et al., "Two-dimensional packing problems: A survey," European Journal of Operational Research 141, Sep. 2002, pp. 241-252.
Merolla et al., "A Digital Neurosynaptic Core Using Embedded Crossbar Memory with 45pJ per Spike in 45nm," IEEE, Custom Integrated Circuits Conference, Sep. 19-21, 2011, pp. 1-4.
Stromatias et al., "Power analysis of large-scale, real-time neural networks on SpiNNaker," IEEE, The 2013 International Joint Conference on Neural Networks, Aug. 4-9, 2013, pp. 1-8.
Amir et al., U.S. Appl. No. 14/871,680, filed Sep. 30, 2015.
Lodi et al., "Chapter 5, Two-Dimensional Bin Packing Problems," Paradigms of Combinatorial Optimization, Revised and Updated 2nd Edition, 2010, 23 pages.
Garey et al., "Computers and Intractability: A Guide to the Theory of NP-Completeness," W.H. Freeman, 1979, 4 pages.
Non-Final Office Action from U.S. Appl. No. 14/871,680, dated Aug. 6, 2018.
Notice of Allowance from U.S. Appl. No. 14/871,680, dated Jan. 28, 2019.
Yao et al., "A New Evolutionary System for Evolving Artificial Neural Networks," IEEE Transactions on Neural Networks, vol. 8, No. 3, May 1997, pp. 694-713.
Eichner et al., "Neural simulations on multi-core architectures", Frontiers in Neuroinformatics, vol. 3, No. 21, Jul. 2009, pp. 1-15.
Furber, S., "Large-scale neuromorphic computing systems," Journal of Neural Engineering, vol. 13, 2016, pp. 1-14.
List of IBM Patents or Patent Applications Treated as Related.
Supplemental Notice of Allowance from U.S. Appl. No. 14/871,680, dated May 6, 2019.

* cited by examiner

OPTIMIZING CORE UTILIZATION IN NEUROSYNAPTIC SYSTEMS

This invention was made with Government support under HR0011-09-C-0002 awarded by Defense Advanced Research Projects Agency (DARPA). The Government has certain rights in this invention.

BACKGROUND

The present invention relates to neurosynaptic systems, and more specifically, this invention relates to optimizing the usage of neurosynaptic cores of a neurosynaptic system.

Core-based neurosynaptic systems are built of multiple neurosynaptic cores, where the neurosynaptic cores are configured and connected to form a network. A single neurosynaptic chip contains a fixed number of neurosynaptic cores. Chips of various sizes, i.e., number of cores, can be manufactured. To implement a neurosynaptic system, one or more chips are needed. In general, it is desired to minimize the number of chips used by the system. This goal can be served by minimizing the number of cores.

BRIEF SUMMARY

In one embodiment, a computer program product for optimizing core utilization in a neurosynaptic network includes a computer readable storage medium having program instructions embodied therewith, where the computer readable storage medium is not a transitory signal per se, and where the program instructions are executable by a processor to cause the processor to perform a method including identifying, by the processor, one or more unused portions of a neurosynaptic network, and for each of the one or more unused portions of the neurosynaptic network, disconnecting, by the processor, the unused portion from the neurosynaptic network.

In another embodiment, a system includes a processor, and logic integrated with the processor, executable by the processor, or integrated with and executable by the processor, where the logic is configured to identify one or more unused portions of a neurosynaptic network, and for each of the one or more unused portions of the neurosynaptic network, disconnect the unused portion from the neurosynaptic network.

In another embodiment, a computer program product for optimizing core utilization in a neurosynaptic network includes a computer readable storage medium having program instructions embodied therewith, where the computer readable storage medium is not a transitory signal per se, and where the program instructions are executable by a processor to cause the processor to perform a method including identifying, by the processor, independent blocks of a first plurality of cores of a neurosynaptic network, and reconfiguring, by the processor, the independent blocks onto the first plurality of cores by calculating a new mapping for at least one of the independent blocks, and moving, by the processor, the at least one of the independent blocks to a new location on a different core of the first plurality of cores of the neurosynaptic network in accordance with the new mapping.

Other aspects and embodiments of the present invention will become apparent from the following detailed description, which, when taken in conjunction with the drawings, illustrate by way of example the principles of the invention.

DETAILED DESCRIPTION

Figure 1:
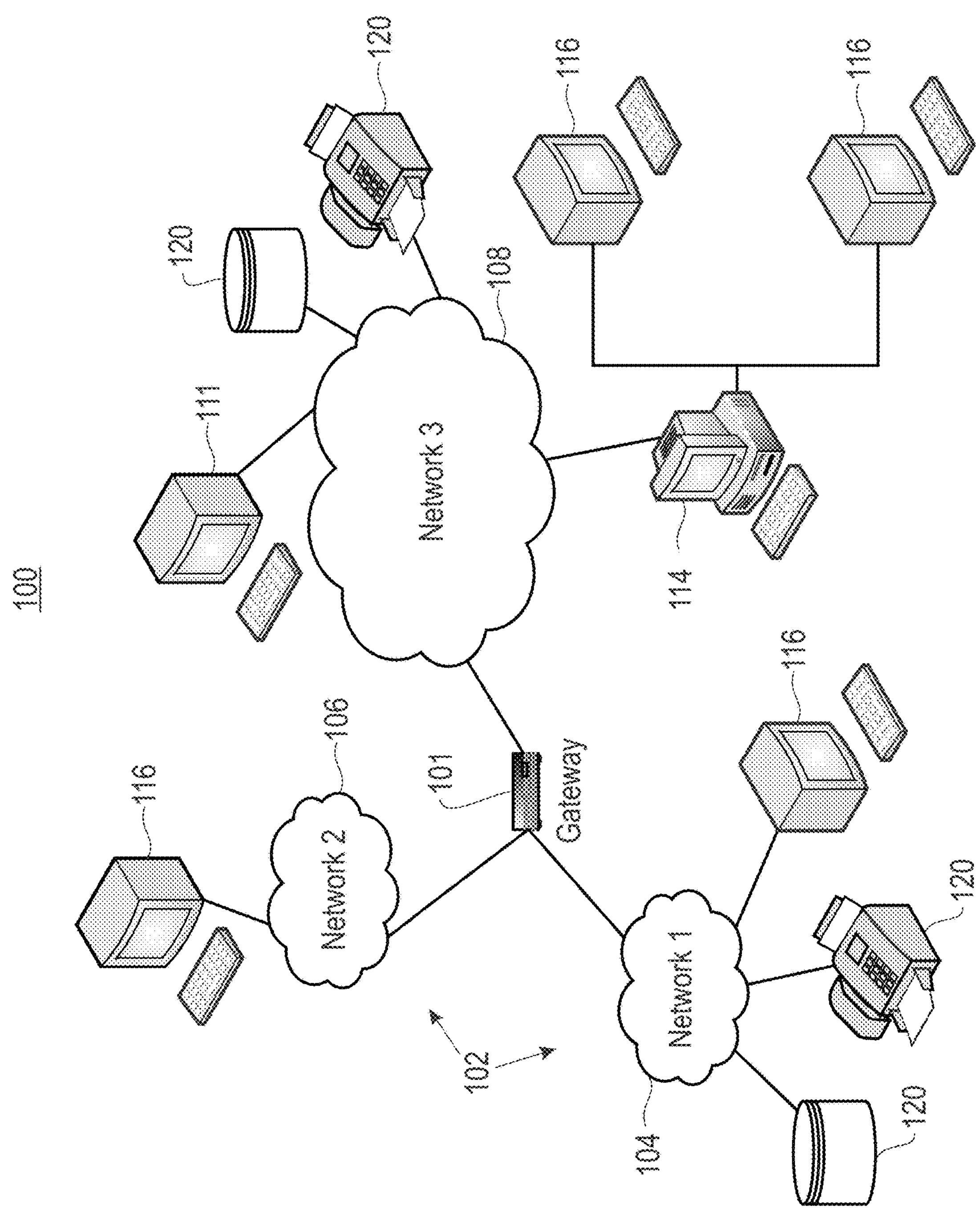
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for optimizing core utilization in neurosynaptic systems.

In the various embodiments described below, one or more neurosynaptic cores of a neurosynaptic network may be analyzed, and then modified to reduce the number of utilized cores while preserving the computational functionality of the original neurosynaptic network. The resulting neurosynaptic network may perform the same computation as the original neurosynaptic network while reducing a footprint of the network and/or consuming less power. Such a benefit may be realized by identifying and removing unused portions of the neurosynaptic network, splitting one or more cores into independent blocks, and moving at least a portion of the independent blocks to other cores without affecting the overall network functionality.

In one general embodiment, a computer-implemented method is provided for optimizing core utilization in a neurosynaptic network. The computer-implemented method comprises identifying one or more unused portions of a neurosynaptic network. Additionally, the computer-implemented method comprises, for each of the one or more unused portions of the neurosynaptic network, disconnecting the unused portion from the neurosynaptic network.

In another general embodiment a computer-implemented method is provided for optimizing core utilization in a neurosynaptic network. The computer-implemented method comprises identifying independent blocks of a first plurality of cores of a neurosynaptic network. Moreover, the computer-implemented method comprises reconfiguring the independent blocks onto the first plurality of cores by calculating a new mapping for at least one of the independent blocks, and moving the at least one of the independent blocks to a new location on a different core of the first plurality of cores of the neurosynaptic network in accordance with the new mapping.

In another general embodiment, a computer program product is provided for optimizing core utilization in a neurosynaptic network. The computer program product comprises a computer readable storage medium having program instructions embodied therewith. The program instructions are executable by a processor to cause the processor to identify one or more unused portions of a plurality of cores of a neurosynaptic network. Also, the program instructions are executable by the processor to cause the processor to, for each of the one or more unused portions of the plurality of cores of the neurosynaptic network, disconnect the unused portion from the neurosynaptic network. Moreover, the program instructions are executable by the processor to cause the processor to identify independent blocks of the plurality of cores of the neurosynaptic network. Still yet, the program instructions are executable by the processor to cause the processor to reconfigure the independent blocks onto the plurality of cores by calculating a new mapping for at least one of the independent blocks, and moving the at least one of the independent blocks to a new location on a different core of the neurosynaptic network in accordance with the new mapping.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
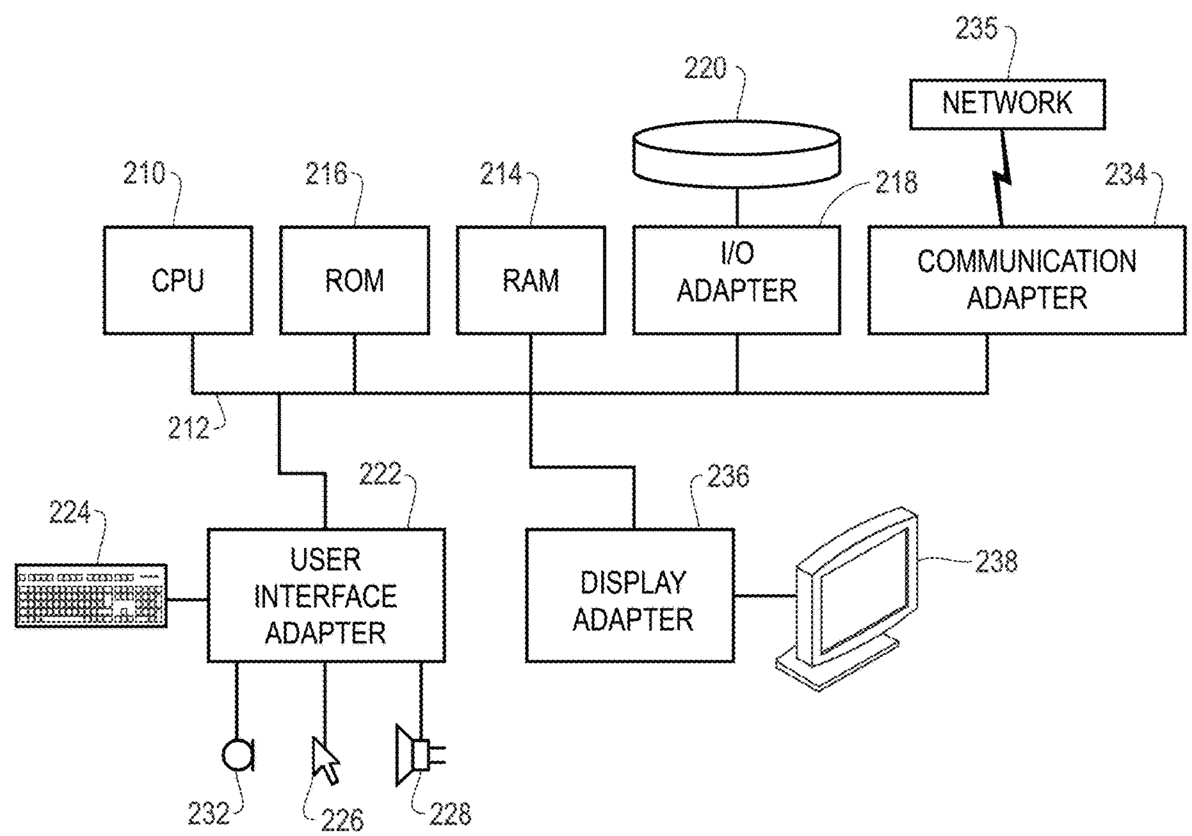
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3A:
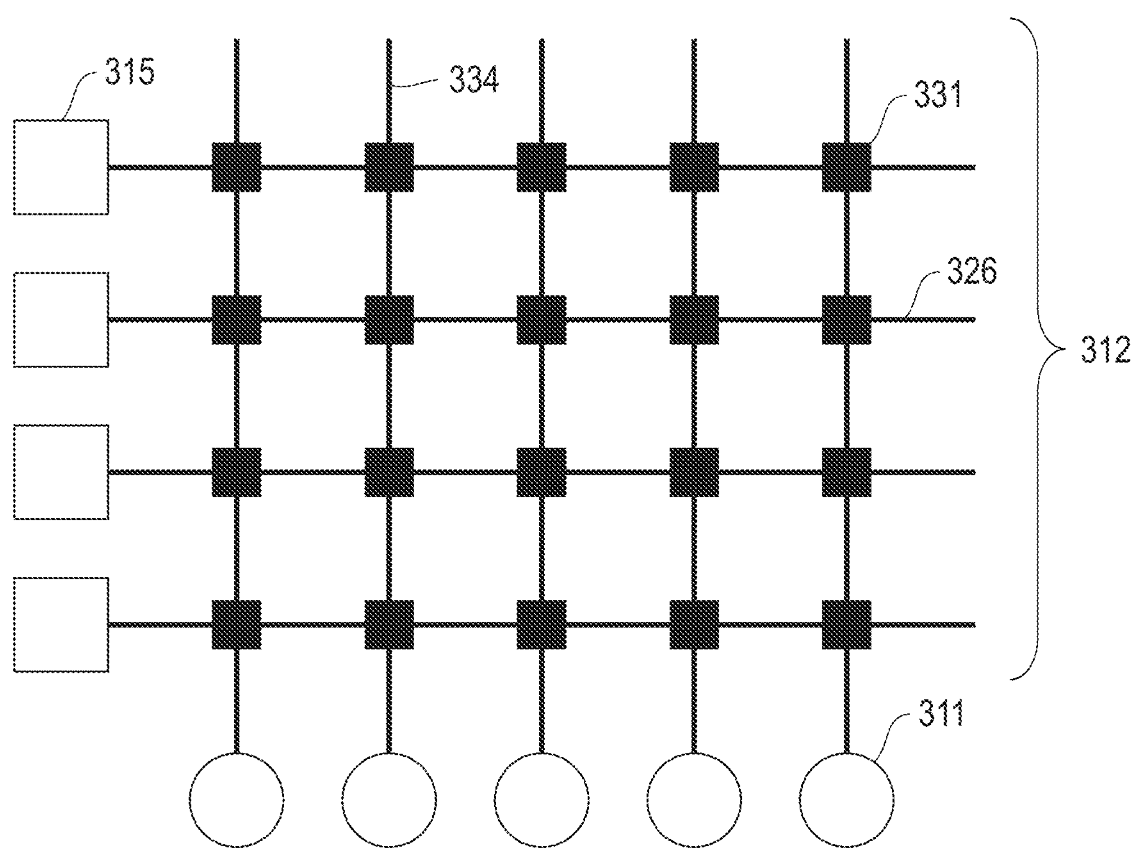
FIG. 3A illustrates a neurosynaptic core circuit, in accordance with an embodiment of the invention.

Now referring to FIG. 3A, a neurosynaptic core circuit 310, also herein referred to as a neurosynaptic core 310, is shown in accordance with an embodiment of the invention. The neurosynaptic core 310 is a neural core circuit. The neurosynaptic core 310 comprises multiple incoming axons 315 and multiple neurons 311. Each neuron 311 and each axon 315 has configurable operational parameters. The neurosynaptic core 310 further comprises a synaptic crossbar 312 including multiple synapses 331, multiple rows/axon paths 326, and multiple columns/dendrite paths 334.

Each synapse 331 communicates firing events (e.g., spike events or spikes) between an axon 315 and a neuron 311. Specifically, each synapse 331 is located at cross-point junction between an axon path 326 and a dendrite path 334, such that a connection between the axon path 326 and the dendrite path 334 is made through said synapse 331. Each axon 315 is connected to an axon path 326, such that said axon 315 sends spikes to the connected axon path 326. Each neuron 311 is connected to a dendrite path 334, such that said neuron 311 receives spikes from the connected dendrite path 334. Each axon 315 may send information in the form of a spike, and the information may then be communicated to connected neurons 311, which may perform some computation on the information. In some instances, the computations performed by the neurons 311 may result in new spikes that are communicated to additional axons 315 on the same and/or different neurosynaptic core 310.

Each synapse 331 has a synaptic weight. The synaptic weights of the synapses 331 of the neurosynaptic core 310 may be represented by a weight matrix W, wherein an entry $W_{ij}$ of the matrix W represents a synaptic weight of a synapse 331 located at a row/axon path i and a column/dendrite path j of the crossbar 312. In one embodiment, the synapses 331 are binary memory devices. Each synapse 331 can have a weight "0" indicating that said synapse 331 is non-conducting, or a weight "1" indicating that said synapse 331 is conducting. A learning rule such as spike-timing-dependent plasticity (STDP) may be applied to update the synaptic weights of the synapses 331.

For the sake of simplicity, the neurosynaptic core 310 is shown to include four axons 315 and five neurons 311, and a corresponding number of axon paths 326, dendrite paths 334, and synapses 331. It is understood that the neurosynaptic core 310 of FIG. 3A is shown for illustrative purposes, and, in various embodiments, the neurosynaptic core 310 may comprise any number of axons and neurons, and corresponding axon paths, dendrite paths, and synapses. For example, the neurosynaptic core 310 may comprise 64 axons and 64 neurons, 128 axons and 128 neurons, 256 axons and 256 neurons, 512 axons and 512 neurons, etc.

Figure 3B:
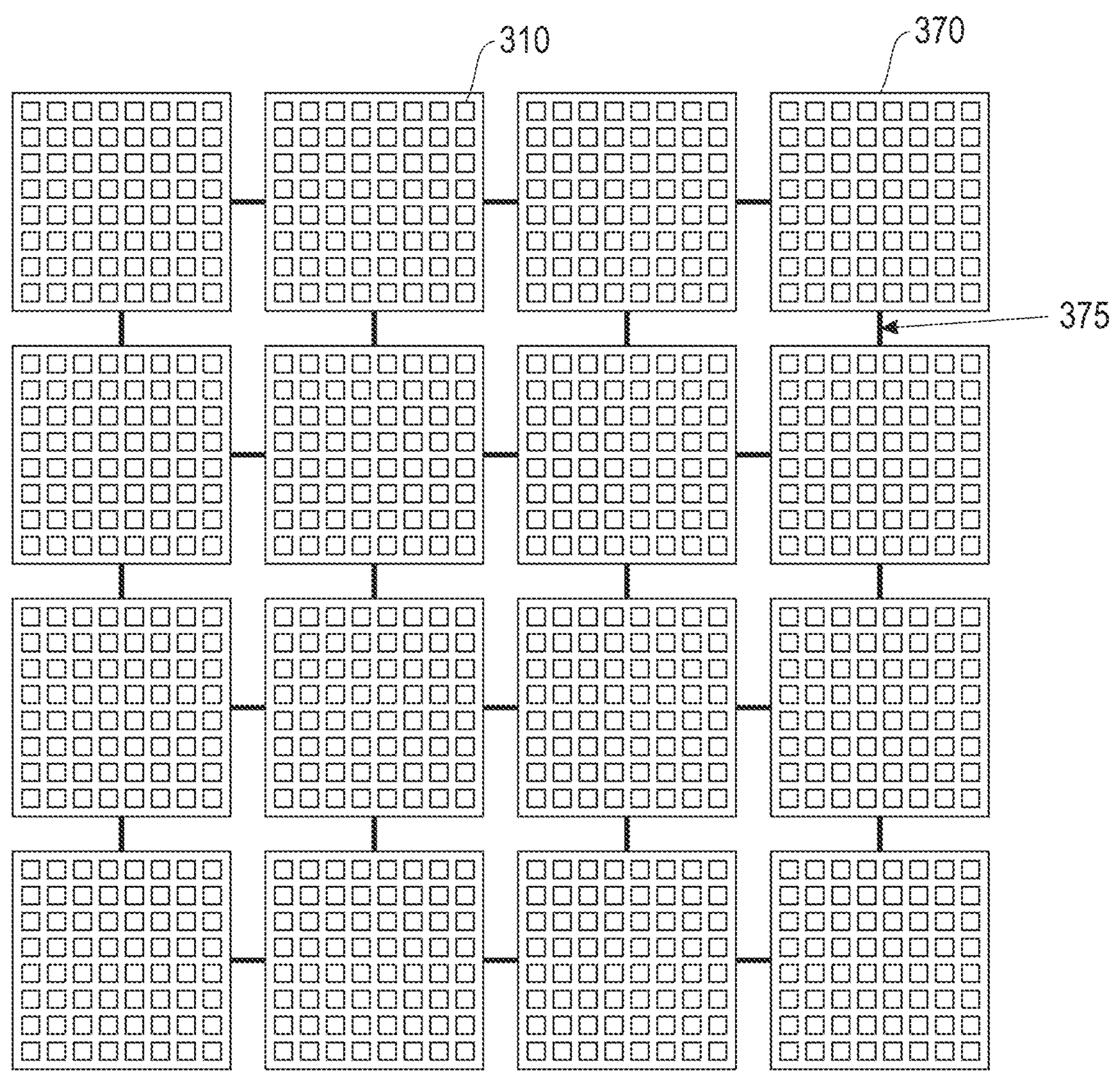
FIG. 3B illustrates a neurosynaptic network, in accordance with an embodiment of the invention.

FIG. 3B illustrates a neurosynaptic network 350, in accordance with an embodiment of the invention. The neurosynaptic network 350 is a scalable neuromorphic and synaptronic architecture. As shown, the neurosynaptic network 350 may include multiple chip structures 370, and each chip structure 370 comprises multiple neurosynaptic cores 310. Of course, in other embodiments, a neurosynaptic network may comprise only a single chip structure 370, with the single chip structure 370 including multiple neurosynaptic cores 310. Each single chip structure 370 may include any number of neurosynaptic cores 310. For example, a single chip structure 370 may include 256, 1024, 4096, etc. neurosynaptic cores 310.

An event-routing system 375 of the neurosynaptic network 350 routes firing events between neurosynaptic cores 310 of the chip structures 370. A neurosynaptic core 310 of the neurosynaptic network 350 may send firing events to, and receive firing events from, another neurosynaptic core 310 of the same chip structure 370 or a different chip structure 370.

In one embodiment, the routing system 375 comprises point-to-point connections. In another embodiment, the routing system 375 comprises network-on-chip channels and inter-chip routers.

In one embodiment, a neural network including at least one neurosynaptic core 310 may be implemented as a time-division multiplexed neurosynaptic module. A neurosynaptic module is an electronic device comprising at least one multi-way parallel processor.

Neurosynaptic networks may be configured or programmed in various ways. For example, neurosynaptic networks may be configured or programmed by a person, or automatically by a computer system (e.g., via optimization algorithms, machine learning, etc.). As an option, neurosynaptic networks may be programmed utilizing one or more reusable program blocks, which may also be referred to as "corelets." After programming is completed, neurons or synapses may remain connected or allocated without having a destination to send spikes. For example, where a large image is received as input to a neurosynaptic network, and the neurosynaptic network only operates on a part of the image, neurons may be allocated but not used.

Reducing the number of neurosynaptic cores 310 utilized to perform a given task without affecting the functionality of a neurosynaptic network may save cost by reducing the total of chip sizes used. Moreover, reducing the number of neurosynaptic cores 310 utilized to perform a given task without affecting the functionality of the neurosynaptic network may save power during execution.

Accordingly, removing unused portions of a neurosynaptic network may allow the neurosynaptic network to fit on a smaller, lower-cost chip, as well as reduce power consumption during operation of the neurosynaptic network. In some circumstances, where a neurosynaptic network is duplicated and deployed in large quantities, the optimization may be done once while the cost saving is multiplied by the number of deployed copies of the neurosynaptic network.

Figure 4A:
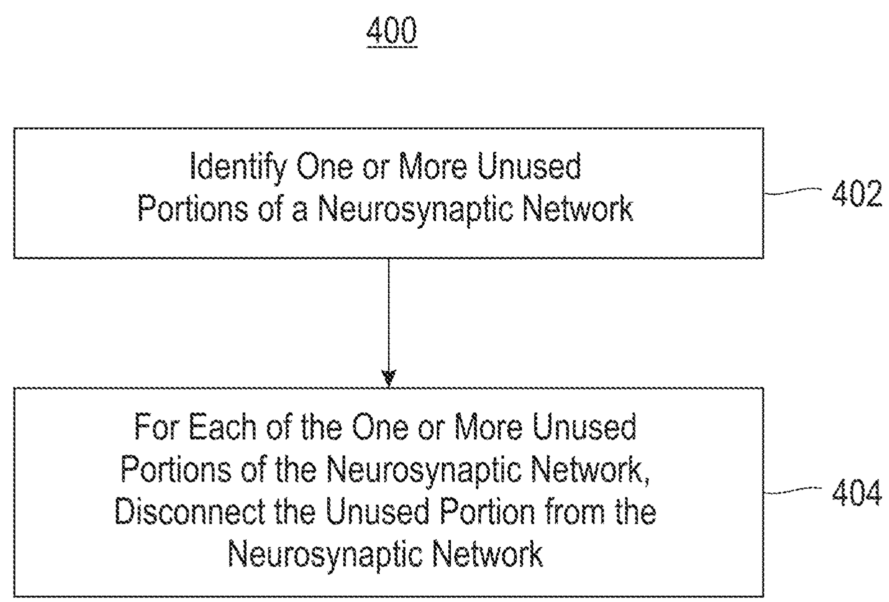
FIG. 4A illustrates a method for optimizing core utilization in neurosynaptic systems, according to one embodiment.

Now referring to FIG. 4A, a flowchart of a method 400 for optimizing core utilization in neurosynaptic systems is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field-programmable gate array (FPGA), etc., combinations thereof, or any other suitable computing device known in the art.

As shown in FIG. 4A, method 400 initiates with operation 402, where one or more unused portions of a neurosynaptic network are identified. As described above, the neurosynaptic network may comprise any network of one or more neurosynaptic cores, wherein each of the neurosynaptic cores comprises axons and neurons, and corresponding axon paths, dendrite paths, and synapses.

An unused portion of the neurosynaptic network comprises any neuron or axon that cannot affect the output of the neurosynaptic network. For example, if a given neuron has its output disconnected, then the neuron cannot affect the output of the neurosynaptic network.

More specifically, an unused axon may comprise an axon not connected to any source (e.g., a neuron, external source, etc.), or not connected to any destination (e.g., a crossbar, etc.). Moreover, an unused neuron may comprise a neuron that is not connected to any source (e.g., a crossbar, etc.) and is not a spontaneous neuron, or is not connected to any destination (e.g., an axon, an external destination, etc.). A spontaneous neuron may comprise any neuron that spikes without input. Additionally, a silent neuron may comprise a neuron that, based on its configuration, cannot ever spike independent of its synaptic input, if any.

In one embodiment, unused portions of a neurosynaptic network may be identified by scanning neurosynaptic cores of the neurosynaptic network. If a given neuron is determined to not be sending a spike outside of its neurosynaptic core, and not sending a spike inside of its neurosynaptic core, then the neuron may not be being used, and may be identified as an unused portion of the neurosynaptic network.

Additionally, at operation 404, for each of the one or more unused portions of the neurosynaptic network, the unused portion is disconnected from the neurosynaptic network.

For a given neuron that has its output disconnected and cannot affect the output of the neurosynaptic network, removing such a neuron and disconnecting its inputs may free this neuron to perform other tasks within the neurosynaptic network. As an option, removing such a neuron and disconnecting its inputs, and not connecting the neuron to perform other tasks, may reduce a size of the neurosynaptic network.

In one embodiment, disconnecting the unused portions of the neurosynaptic network may include, for each unused neuron and unused axon, removing all intra-core connections (e.g., crossbar connections, etc.) of the unused neuron or unused axon, and removing all inter-core connections of the unused neuron or unused axon. Accordingly, when an unused portion of the neurosynaptic network is identified, all sources, crossbar connections, and destinations may be removed from the unused portion. As an option, after removing all sources, crossbar connections, and destinations from the unused portion, a function of the unused portion may be assigned to NULL.

In some embodiments, the operations 402 and 404 may be iteratively repeated until no unused portions are identified within the neurosynaptic network, and/or no additional axons and/or neurons may be removed from the neurosynaptic network.

Figure 4B:
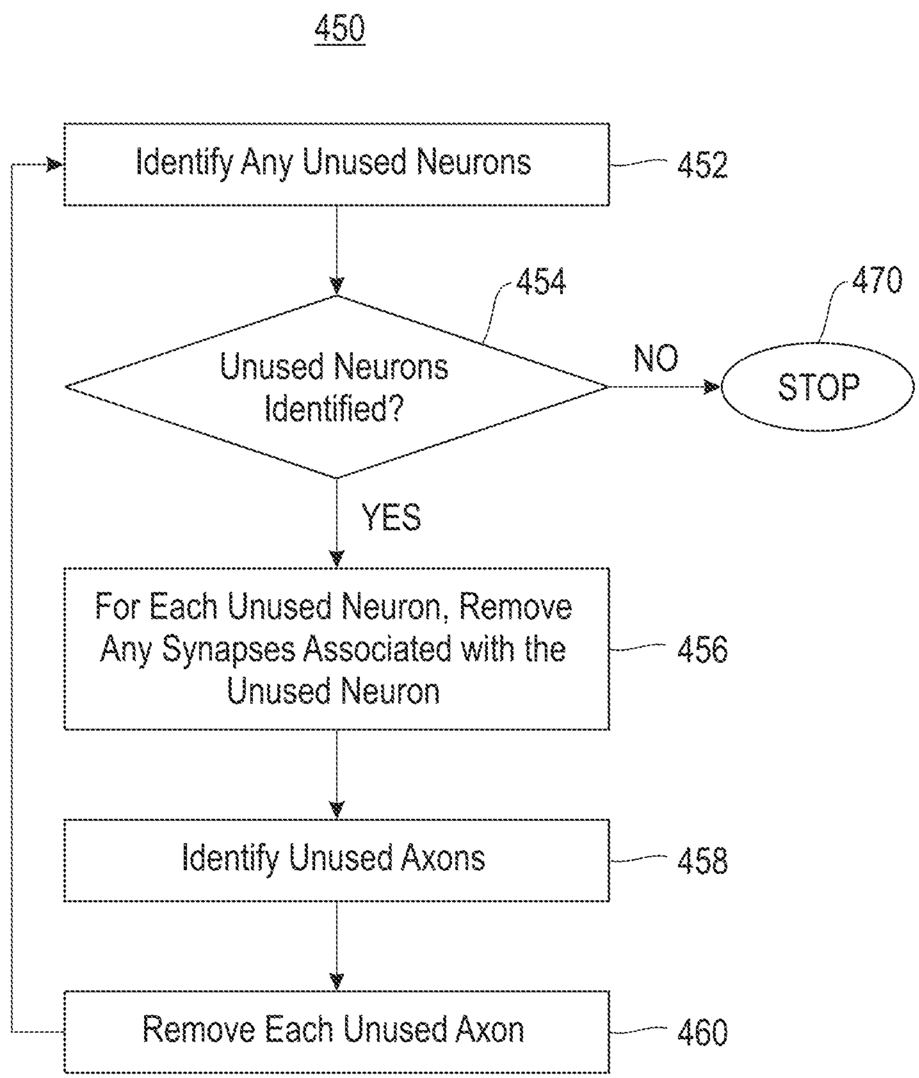
FIG. 4B illustrates a method for identifying and removing one or more unused portions of a neurosynaptic network, in accordance with an embodiment.

For example, referring to FIG. 4B, a flowchart of a method 450 for identifying and removing one or more unused portions of a neurosynaptic network, is shown according to one embodiment. The method 450 may be performed in accordance with the present invention in any of the environments depicted in FIGS. 1-3, among others, in various embodiments. Of course, more or less operations than those specifically described in FIG. 4B may be included in method 450, as would be understood by one of skill in the art upon reading the present descriptions.

Each of the steps of the method 450 may be performed by any suitable component of the operating environment. For example, in various embodiments, the method 450 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4B, method 450 initiates with operation 452, where any unused neurons within a neurosynaptic network are identified. If it is determined, at operation 454, that no unused neurons are identified, then the method may stop at operation 470. However, if unused neurons are identified at operation 452, then, for each unused neuron, synapses associated with the unused neuron are removed at operation 456.

As a result of removing the synapses associated with the unused neurons, one or more axons within the neurosynaptic network may no longer be connected. In other words, removing an unused neuron may in turn leave one or more axons disconnected.

Accordingly, at operation 458, unused axons are identified, and each of the unused axons is removed at operation 460. Moreover, after removing the unused axons at operation 460, neurons previously connected to such axons may now be identified as unused. Accordingly, unused neurons are again identified at operation 452, and the method 450 may iterate until no neurons and axons remain that are not affecting the output of the neurosynaptic network. In this manner, after disconnecting one or more unused portions from the neurosynaptic network, one or more additional unused portions of the neurosynaptic network may be identified and disconnected. In other words, the method 450 may ensure that all unused portions of a neurosynaptic network are removed.

An algorithm for identifying and disconnecting unused portions of the neurosynaptic network according to one specific embodiment is provided as pseudocode in Table 1. For a general graph, the algorithm of Table 1 is guaranteed to terminate in at most $n^2$ steps, where n is the number of neurons in the neurosynaptic network. Of course, such pseudocode is provided as an option, and should not be construed as limiting in any manner.

TABLE 1

```
Scan the network, add any unused neuron/axon to a queue.
While the queue is not empty:
    pop the first item from the queue.
    if it is unused
        add its neighbors (all its sources and destinations) to the queue
        disconnect its sources, destinations, crossbar.□
        mark it as NULL.
end
```

Figure 5A:
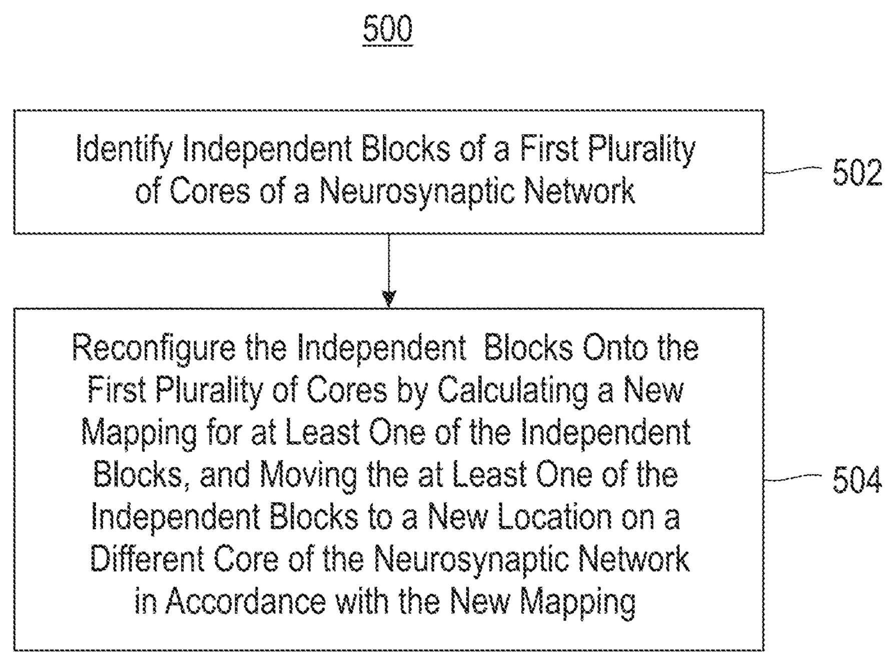
FIG. 5A illustrates a method for optimizing core utilization in neurosynaptic systems, according to one embodiment.

Now referring to FIG. 5A, a flowchart of a method 500 for optimizing core utilization in neurosynaptic systems is shown according to one embodiment. The method 500 may be performed in accordance with the present invention in any of the environments depicted in FIGS. 1-3, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, method 500 may initiate with operation 502, where independent blocks of a first plurality of cores of a neurosynaptic network are identified.

As used herein, a block comprises at least a portion of a crossbar of a neurosynaptic core, and contains at least one neuron. In various embodiments, each block comprises a portion of a crossbar of a neurosynaptic core, and contains one or more neurons connected to one or more axons. Moreover, an independent block comprises a block for which there is no crossbar connection between any axon or neuron in the block and a neuron or axon in another block. Accordingly, a first independent block may be placed on the same core as a second independent block, or on a different core than the second independent block, without affecting the output of either first independent block or the second independent block.

Figure 5B:
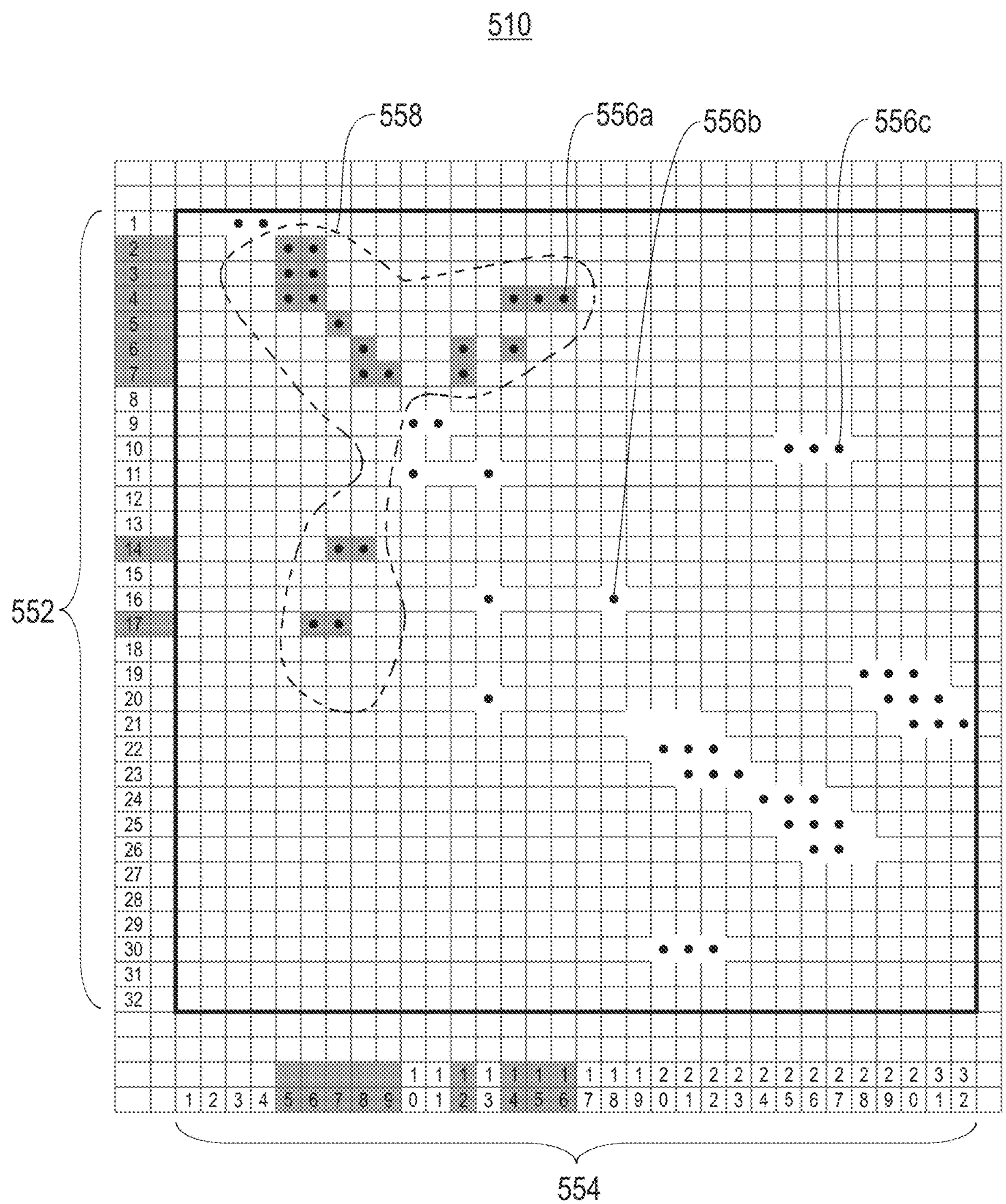
FIG. 5B illustrates a neurosynaptic core containing a plurality of independent blocks, according to one embodiment.

For example, referring to FIG. 5B, a neurosynaptic core 510 is illustrated as containing a plurality of independent blocks. The neurosynaptic core 510 may be substantially identical to the neurosynaptic core 310 previously described in the context of FIG. 3.

The neurosynaptic core 510 is illustrated to include axons 552 and neurons 554. While the neurosynaptic core 510 is illustrated to include 32 axons 552 and 32 neurons 554, it is understood that the neurosynaptic core 510 may include any number of axons 552 and neurons 554. Still yet, the neurosynaptic core 510 is shown to include a plurality of connected or conducting synapses 556. By way of example, synapse 556*a* is shown to connect axon number 4 with neuron number 16, synapse 556*b* is shown to connect axon number 16 with neuron number 18, and synapse 556*c* is shown to connect axon number 10 with neuron number 27. As noted above, each synapse is located at a cross-point junction between an axon path and a dendrite path, such that a connection between the axon path and the dendrite path is made through said synapse.

Moreover, the neurosynaptic core 510 is shown to include a plurality of independent blocks. In particular, Table 2 identifies five independent blocks included within the neurosynaptic core 510 of FIG. 5B.

TABLE 2

| Block number | Neurons | Axons |
|---|---|---|
| 1 | 3, 4 | 1 |
| 2 | 5, 6, 7, 8, 9, 12, 14, 15, 16 | 2, 3, 4, 5, 6, 7, 14, 17 |
| 3 | 10, 11, 13, 18, 28, 29, 30 | 9, 11, 16, 19, 20, 21 |
| 4 | 24, 25, 26, 27 | 10, 24, 25, 26 |
| 5 | 20, 21, 22, 23 | 22, 23, 30 |

Independent block number 2 of Table 2 is illustrated within FIG. 5B as independent block 558. In particular, independent block 558 is shown to include axon numbers 2, 3, 4, 5, 6, 7, 14, and 17, and neuron numbers 5, 6, 7, 8, 9, 12, 14, 15, and 16. For each of the axons and neurons in the independent block 558, there are no crossbar connections to other axons or neurons of another of the independent blocks. Accordingly, the independent block 558 may be placed on the same core as any of the other independent blocks, or on a different core than the other independent blocks, without affecting the output of either independent block 558 or the other independent blocks. Moreover, each of the independent blocks of FIG. 5B may be relocated to a neurosynaptic core other than neurosynaptic core 510 without affecting the output of any of the other independent blocks.

While the independent blocks of Table 2 are shown to each include at least one neuron and at least one axon, it is anticipated that in some circumstance a single spontaneous neuron may comprise an independent block.

The independent blocks of the neurosynaptic cores may be identified, at operation 502, utilizing any suitable approach. In one embodiment, the neurosynaptic network may first be segmented into its constituent neurosynaptic cores. Further, each of the neurosynaptic cores may then be segmented into independent blocks.

As an option, segmenting a neurosynaptic core into independent blocks may include selecting a first neuron of the neurosynaptic core, and then identifying all axons connected to the first neuron. The first neuron and the axons connected to the first neuron may be added to a list. Next, it may be determined whether additional neurons are connected to any of the axons identified as connected to the first neuron. If additional neurons are identified, the additional neurons may be added to the list. Further, this process may iteratively continue (i.e., by identifying any additional axons that are connected to any of the additional neurons, etc.) until no more axons and neurons are identified and added to the list. At the conclusion of the process, the list may include all constituent axons and neurons that comprise an independent block. Subsequently, a second neuron of the neurosynaptic core that is not already identified as included in an independent block may be selected, and then axons and neurons connected to the second neuron may be identified as comprising a second independent block. Additional neurons may be selected and analyzed, until no additional neurons remains that have not been identified as part of an independent block.

An algorithm for identifying independent blocks of cores of a neurosynaptic network according to one specific embodiment is provided as pseudocode in Table 3. The algorithm of Table 3 may be guaranteed to terminate in a linear time because, with each iteration, it marks one neuron by its block ID. Of course, such pseudocode is provided as an option, and should not be construed as limiting in any manner.

TABLE 3

```
For each core:
    mark all (used) neurons and all (used) axons as "unblocked"
    bi=1; % the block number
    while there are any "unblocked" neurons:
        empty queue
        Select first "unblocked" neuron and add it to the queue
        while the queue is not empty
            pop first element
            mark it as "block bi"
            add its neighbors on the crossbar to the queue
        end
        bi=bi+1
    end
```

Additionally, the independent blocks are reconfigured onto the first plurality of cores at operation 504. The independent blocks are reconfigured by calculating a new mapping for at least one of the independent blocks, and moving the at least one of the independent blocks to a new location on a different core of the neurosynaptic network in accordance with the new mapping.

An independent block may be moved to a new location on a different neurosynaptic core by configuring the axons, neurons, and crossbar of the different neurosynaptic core with the functionality provided by the independent block on its original neurosynaptic core, and routing all input/output connections of the independent block to the independent block on the different neurosynaptic core.

New mappings for the independent blocks may be calculated utilizing any suitable approach. In one embodiment, the new mappings may be calculated by sorting the independent blocks of the neurosynaptic cores into two lists. A first list of the two lists may include the independent blocks of the neurosynaptic cores in decreasing order of the number of axons in each independent block. A second list of the two lists may include the independent blocks of the neurosynaptic cores in decreasing order of the number of neurons in each independent block. Further, a first one of the neurosynaptic cores may be selected and filled by iteratively picking an independent block from the top of one of the two lists, and mapping the independent block to the core.

An independent block may be picked by comparing a largest dimension of a first independent block at the top of the first list (i.e., a number of axons in the first independent block, or number of neurons in the first independent block, whichever is larger), with a largest dimension of a second independent block at the top of the second list (i.e., a number of axons in the second independent block, or number of neurons in the second independent block, whichever is larger). Next, the independent block having the largest larger value may then be picked for placement on the selected neurosynaptic core.

Additionally, if there are more remaining axons than neurons, a first fitting independent block may be picked from the first list including the independent blocks of the neurosynaptic cores in decreasing order of the number of axons in each independent block. However, if there are not more remaining axons than neurons, a first fitting independent block may be picked from the second list including the independent blocks of the neurosynaptic cores in decreasing order of the number of neurons in each independent block.

Additional independent blocks may be picked and placed on the first selected neurosynaptic core until the first selected neurosynaptic core has been filled (i.e., no additional independent blocks can fit on a remaining area of the crossbar of the neurosynaptic core), at which point a second neurosynaptic core may be selected and filled in the same manner. This process may continue until all independent blocks have been placed. Moreover, this process may effectively balance neuron-dominant and axon-dominant blocks and fit them together on the same neurosynaptic cores, thereby maximizing the usage of both the axons and neurons on each neurosynaptic core, as shown below in the context of FIGS. 6A, 6B, and 6C.

An algorithm for reconfiguring the independent blocks onto a plurality of cores according to one specific embodiment is provided as pseudocode in Table 4. Of course, such pseudocode is provided as an option, and should not be construed as limiting in any manner.

TABLE 4

```
Input: a set of n blocks, b__1..b__n
Output: an assigned core number c__i (in C) for each b__i
Objective: minimize the total number of cores (the size of C)
Let n__i and a__i denote the number of neurons and the number of axons
in
block b__i, respectively.
1. Sort all blocks on two lists, one is in decreasing order of a__i and the
other is by decreasing order of n__i.
2. Use dynamic programming for filling up the next core:
    pick up the top block from one of the two lists, for which the larger
dimension is the largest. Place it on the core.
    Repeat
        If there are more remaining axons than neurons, take first-fit
from the a__i list. Else, take first-fit from the n__i list.
    Until no block can fit on the remaining area of the crossbar
```

Reconfiguring the independent blocks onto the neurosynaptic cores of the neurosynaptic network may be limited by constraints uncharacteristic of typical tiling problems. In particular, when an independent block is placed on a neurosynaptic core, although the independent block may occupy only a small subset of the synapses of the neurosynaptic core, no other independent block may be placed on any axon path or dendrite path utilized by the independent block. Or, in other words, no other independent block may occupy a synapse that is in communication with an axon in the horizontal direction, or a neuron in the vertical direction, included in the independent block.

In one embodiment, wherein each core comprises an array of 256 neurons×256 axons, each independent block comprises a tile of tiles $T_1, \ldots, T_m$ of integral sizes $w_i \times h_i$, where $1 \leq w_i, h_i \leq 256$, and $i=1, \ldots, m$. Each of the tiles is assigned to one of n sites (i.e., cores) $S_1, \ldots, S_n$, and the number of utilized sites may be minimized as follows. Denote by $y_j$ a Boolean variable so that $y_j=1$ if and only if site is utilized; and denote by $x_{ij}$ a Boolean variable so that $x_{ij}=1$ if and only if tile $T_i$ is assigned to site $S_j$. Accordingly, $$\sum_{j=1}^{n} y_j$$

may be minimized subject to:

$$\sum_{j=1}^{n} x_{ij} = 1 \ (i = 1, \ldots, m)$$

$$\sum_{i=1}^{m} w_i x_{ij} \leq 256 y_j \ (j = 1, \ldots, n)$$

$$\sum_{i=1}^{m} h_i x_{ij} \leq 256 y_j \ (j = 1, \ldots, n)$$

$$x_{ij}, y_j \in \{0, 1\}.$$

In another embodiment, wherein each core comprises an array of 256 neurons×256 axons, each independent block comprises a tile that is one of k types of tiles, where there are $k_i$ tiles of type i (i=1, . . . , k), each of a size $w_i \times h_i$, and where $1 \leq w_i, h_i \leq 256$. Each of the tiles is assigned to one of n sites (i.e., cores) $S_1, \ldots, S_n$, and the number of utilized sites may be minimized as follows. Denote by $y_j$ a Boolean variable so that $y_i=1$ if and only if site $S_j$ is utilized; and denote by $x_{ij}$ an integral variable so that $x_{ij}$ is the number of tiles of type i that are assigned to a site $S_j$. Accordingly, $$\sum_{j=1}^{n} y_j$$

may be minimized subject to:

$$\sum_{j=1}^{n} x_{ij} = w_i \ (i = 1, \ldots, k)$$

$$\sum_{i=1}^{k} w_i x_{ij} \leq 256 y_j \ (j = 1, \ldots, n)$$

$$\sum_{i=1}^{k} h_i x_{ij} \leq 256 y_j \ (j = 1, \ldots, n)$$

$x_{ij}$ is integer, $y_j \in \{0, 1\}$.

A model for solving the optimal packing problem with a minimal number of sites, where each tile is one of k types of tiles, is provided as IBM Optimization Programming Language (OPL) code in Table 5. Of course, such code is provided as an option, and should not be construed as limiting in any manner.

TABLE 5

```
int numTypes = ... ;
range Types = 1..numTypes ;
int numTiles[Types] = ... ;
int numSites = ... ;
range Sites = 1..numSites ;
float width[Types] = ... ;
float height[Types] = ... ;
dvar int+ x[Types] [Sites];
dvar boolean y[Sites];
minimize sum (j in Sites) y[j] ;
subject to {
    forall (i in Types) sum (j in Sites) x[i][j] == numTiles[i] ;
    forall (j in Sites) sum (i in Types) width[i]*x[i][j] <= 256 * y[j];
    forall (j in Sites) sum (i in Types) height[i]*x[i][j] <= 256 * y[j];
}
```

Figure 6A:
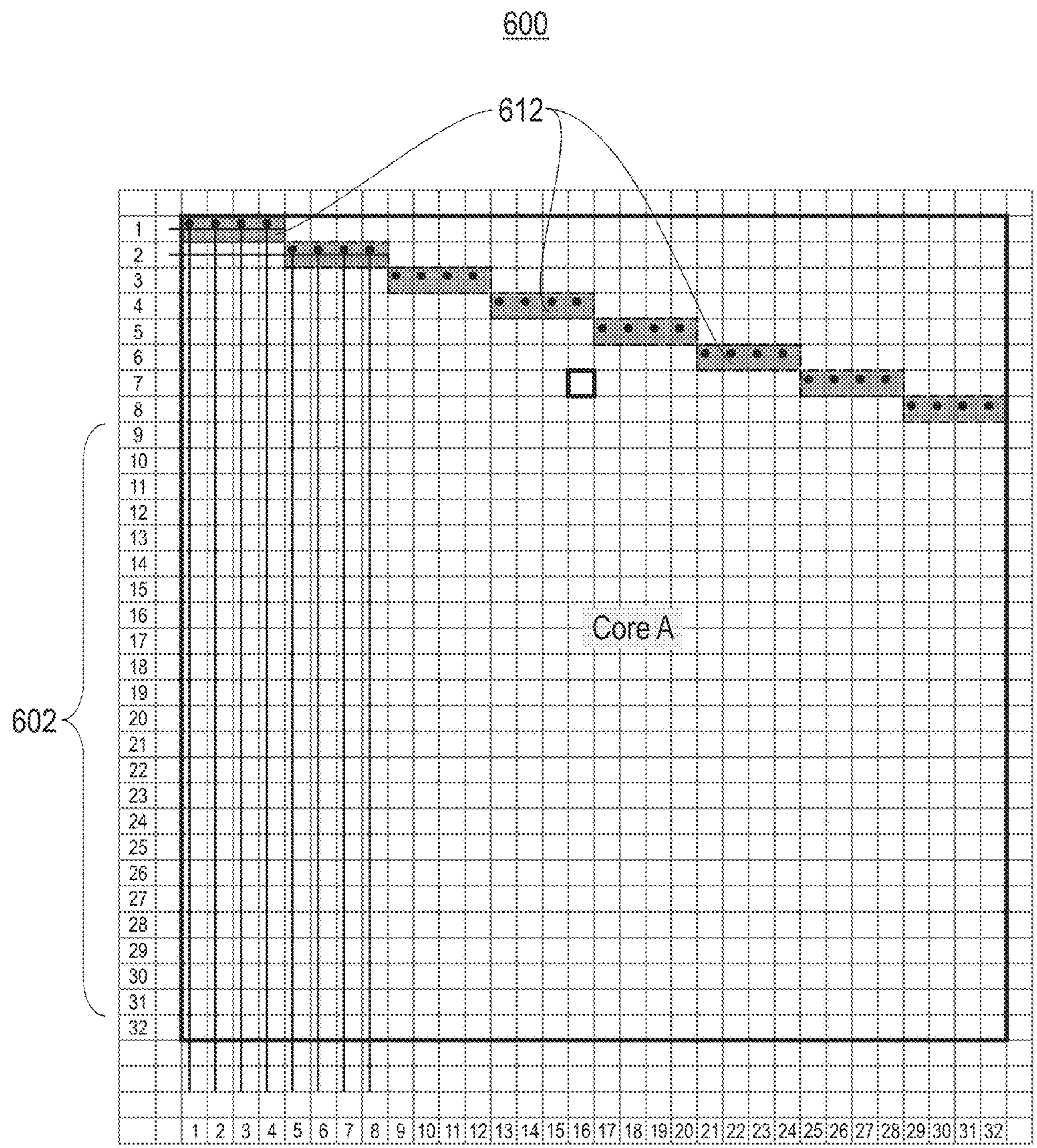
FIG. 6A illustrates a neurosynaptic core of a non-optimized neurosynaptic network, in accordance with one embodiment.
Figure 6B:
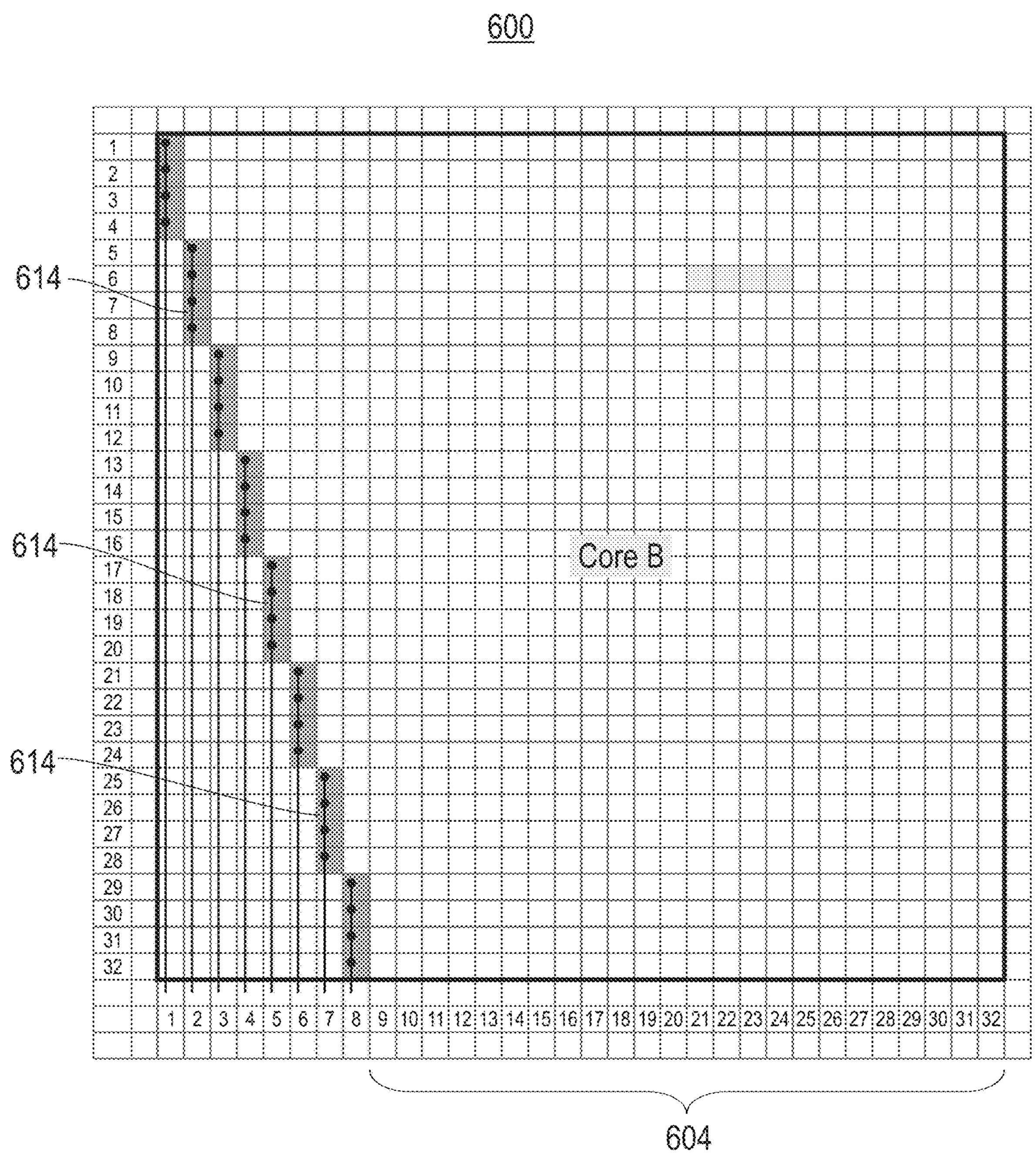
FIG. 6B illustrates another neurosynaptic core of the non-optimized neurosynaptic network, in accordance with one embodiment.

Referring now to FIGS. 6A and 6B, two neurosynaptic cores of a non-optimized neurosynaptic network 600 are shown. In particular, Core A is shown to include a plurality of splitters 612, where each splitter may operate to receive a spike from a given axon, and split the spike to several receiving neurons. For simplicity, each of the splitters 612 of FIG. 6A is shown to split a spike received from an axon to four receiving neurons. Further, none of the splitters 612 is connected to another one of the splitters 612, and each coupling of one axon to four neurons may be identified as an independent block.

Similarly, Core B is shown in FIG. 6B to include a plurality of summers 614. Each of the summers 614 may operate to sum the spikes of several axons, and provide the result to a single neuron. As an option, each of the summers 614 may comprise a weighted summer. For simplicity, each of the summers 614 of FIG. 6B is shown to sum the spikes received from four axons, and provide the result to a single neuron. Further, none of the summers 614 are connected to another one of the summers 614, and each coupling of four axons to one neuron may be identified as an independent block.

Core A is shown to include a significant number of unused axons 602, and Core B is shown to include a significant number of unused neurons 604. More specifically, as illustrated by FIG. 6B, because there are no additional free neurons in Core A, the unused axons 602 of Core A will remain disconnected and unused because no additional independent blocks may be added without interfering with the operation of the currently configured splitters 612. Similarly, because there are no additional free axons in Core B, the unused neurons 604 of Core B will remain unused and disconnected. In other words, as a result of the configurations of Core A and Core B, a significant number of neurons and axons may go completely unutilized. Accordingly, neither Core A nor Core B may currently be configured in an optimal manner.

Figure 6C:
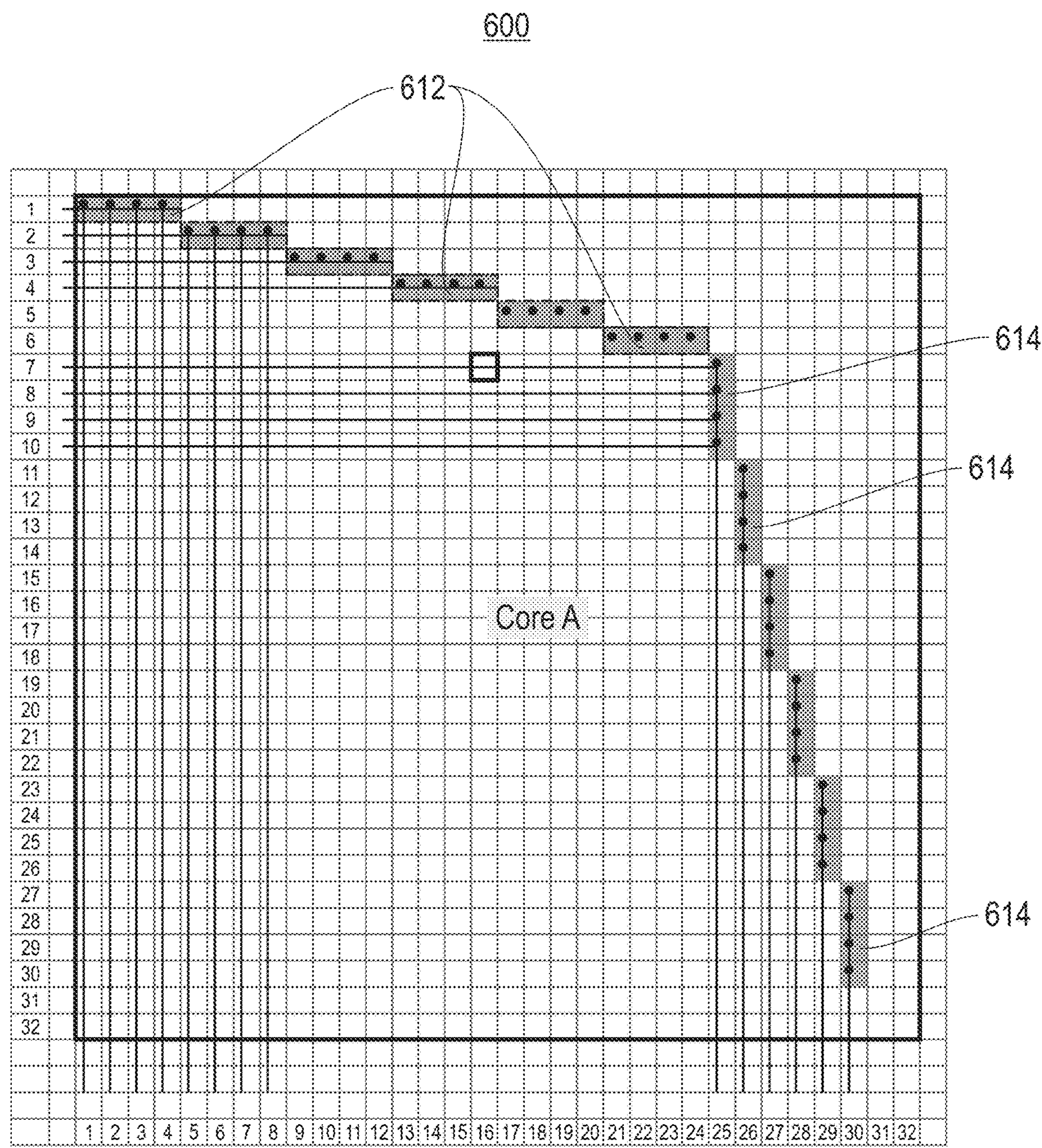
FIG. 6C illustrates a reconfigured neurosynaptic core, according to an embodiment.

Referring now to FIG. 6C, Core A is shown after executing the method of FIG. 5A, wherein the independent blocks of Cores A and B are identified, and then reconfigured using new mappings that increase the overall efficiency of the neurosynaptic network 600. As illustrated by FIG. 6C, some of the summers 614 and some of the splitters 612 may be combined onto the same core such that almost all neurons and all axons of Core A are utilized. As a consequence, fewer neurosynaptic cores may be required to allocate the same number of independent blocks and achieve the same functionality.

In some embodiments, the calculation of the new mappings and cores for the independent blocks may be simplified. For example, the above optimization problem, wherein independent blocks are picked and placed, may be mapped to a simplified problem by grouping together two or more types of independent blocks of similar sizes. Next, each independent block of the group may be replaced with one independent block type of dimensions greater or equal to the maximum of the dimensions of the each block type in the group.

For example, if provided 4 independent blocks of size 20×30 (e.g., 20 axons×30 neurons, or 20 neurons×30 axons), 2 independent blocks of size 22×28, and one independent block of size 20×31, then these three types of independent blocks may be grouped together. Specifically, each of these 7 independent blocks may be replaced with one type of independent block, the one type of independent block having a size of 22×31. Once a location is found on neurosynaptic cores for each of the seven 22×31 independent blocks, then each of the original independent blocks may be mapped to and placed in one of these locations. Because each of the original independent blocks may be smaller than the 22×31 block type, a few axons and a few neurons may be left unused.

In other embodiments, the optimization problem, wherein independent blocks are picked and placed, may be split into several problems by first placing only the largest independent block types on cores, then adding more smaller independent blocks and restarting the optimization, and continuing to solve while each iteration places large independent blocks and adds more small independent blocks.

In some embodiments, a neurosynaptic network may be divided into several parts or partitions, each of which may be optimized separately and independently. As an option, two or more of the partitions may be optimized in parallel. Partitioning the independent blocks into independent parts may ensure that each part is kept on independent cores, and may accelerate the optimization process.

In some embodiments, a neurosynaptic network may be divided by feed-forward traversal of the graph, and split into regions by proximity. Each of these regions can be independently optimized and recombined.

Additionally, after the independent blocks have been reconfigured, block-to-block connectivity may be updated for each of the independent blocks. In other words, because the outputs of one block may be provided as input to one or more other blocks (whether on the same neurosynaptic core or on a different neurosynaptic core), after the independent blocks have been reconfigured, connectivity between the independent blocks may be updated to maintain any such input/output relationships between the blocks.

In some embodiments, a neurosynaptic network may comprise neurosynaptic cores having different properties. For example, a given neurosynaptic network may comprise first neurosynaptic cores all having a same first property, and second neurosynaptic cores all having a same second property. The second property may be different from the first property. For example, all of the first neurosynaptic cores may be of a first size (e.g., axon×neuron dimension), and all of the second neurosynaptic cores may be of a second size, which is different than the first size.

In such an example, the second sized neurosynaptic cores may be larger or smaller than the first sized neurosynaptic cores. It may be inefficient to place many small independent blocks on a large neurosynaptic core. Accordingly, it may be more efficient to place the smaller independent blocks on the smaller neurosynaptic cores, and the larger independent blocks on the larger neurosynaptic cores. In such a scenario, a cost function may associate a cost with unused parts of a crossbar (i.e., parts of the crossbar that are not covered by any blocks that are assigned to the core). By searching to minimize one or more cost functions, a cost function may be utilized to optimize overall neurosynaptic core utilization.

In some embodiments, one or more independent blocks may be marked as unmoveable. As an option, an unmoveable block may be a block that is associated with input that originates from outside of the neurosynaptic network, or provides output that is destined for a location outside of the neurosynaptic network. Accordingly, in such embodiments, identifying the independent blocks of a plurality of cores may include identifying only moveable independent blocks of the cores, such that unmoveable independent blocks of the cores are not reconfigured. This may ensure that any optimization only applies to those blocks that may be moved to different cores without adverse effects on the function of the neurosynaptic network.

In some embodiments, not all neurosynaptic cores of a neurosynaptic network may have the same properties or be operating in an identical manner. For example, some of the neurosynaptic cores may operate at a first time scale, and other neurosynaptic cores may operate at a second time scale that is faster or slower than the first time scale. As a consequence, the neurosynaptic cores across a given neurosynaptic network may be operating a two ore more different time scales. In such circumstances, a block may not be moved from a neurosynaptic core operating at a first time scale to a different neurosynaptic core that is operating at a different time scale.

Accordingly, in such embodiments, the operations of the method 500 may occur independently for each time scale to ensure that blocks are only moved to other neurosynaptic cores operating at the same time scale as the neurosynaptic core that the block originates from. In other words, the cores of a neurosynaptic network may be independently sub-optimized within classes of cores, where each class of cores comprises cores that have the same properties, or are operating in an identical manner.

In some embodiments, the location of an independent block may be selected such that it maximizes connectivity of the independent block with other independent blocks on the same core. This may reduce the connectivity present between two or more cores, and may provide bandwidth, latency, and energy benefits. In other words, while any block of m×n dimensions may fit at a given location of equal or larger dimensions, there may be an advantage to selecting a specific independent block for the location based on other criteria (e.g., connectivity, etc.). Similarly, the new location of a reconfigured independent block may be selected to maximize an expected spike rate between the block and other blocks on the same core, thereby minimizing the external spike rate coming from the neurosynaptic core and destined for other cores. The process of maximizing connectivity and/or an expected spike rate may occur in parallel with, or after, the reconfiguring of the independent blocks based on size.

In one embodiment, the method 500 is performed on a neurosynaptic network after performance of the method 400 on the neuro synaptic network. In other words, after identifying and removing one or more unused portions of a neurosynaptic network, independent blocks of the neurosynaptic network may be identified and reconfigured onto the neurosynaptic cores of the neurosynaptic network. By combining the methods 400 and 500, neurosynaptic core utilization may be optimized throughout the neurosynaptic network.

In the embodiments described hereinabove, one or more neurosynaptic cores of a neurosynaptic network may be analyzed, and then modified to reduce the number of utilized cores while preserving the computational functionality of the original neuro synaptic network. In other words, the resulting neurosynaptic network may perform the same computation as the original neurosynaptic network while reducing a footprint of the network and/or consuming less power. As set forth above, such a benefit may be realized by identifying and removing unused portions of the neurosynaptic network, splitting one or more cores into independent blocks, and moving at least a portion of the independent blocks to other cores without affecting the overall network functionality.

The methods and systems described hereinabove may apply to any network, regardless of how the network was generated. Further, because the above-described optimization occurs after the network has been created, code optimization may not need to be a focus, or even a concern, while generating code that creates such networks having complex functionality. As a result, a programmer may be able to focus on the functionality of such network code, and allow the optimization to be performed subsequently in an automated manner. Additionally, because the methods and systems described hereinabove consider all network components at once, such optimizations may be able to exploit advantages not present during code generation or authorship. In other words, due to limited knowledge and/or access, an author of a first portion of network code may not be able to co-locate onto a given core blocks from the first portion of network code with blocks from another portion of the network code.

Still yet, the network code may be optimized by different algorithms, without requiring a rebuild of the neurosynaptic systems. Even more, the optimization may even be applied on the output of previously optimized components and networks, such as, for example, in the case of using a linker.

As an option, in a fixed-size neurosynaptic chip or neurosynaptic system with a given number of neurosynaptic cores, one may apply optimization and then use the cores freed by the optimization to add additional functionality, or to improve computation accuracy, and therefore improve a final product without incurring additional hardware costs.

Additionally, reducing the number of neurosynaptic cores may save memory, processing cycles, and/or number of processors; and increase speed, reduce power, and/or reduce overall processing time.

As another option, in energy-sensitive systems, such as mobile systems, airborne systems, satellites, remote sensors, etc., reducing the number of cores may reduce energy consumption of the system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for optimizing core utilization in a neurosynaptic network, the computer program product comprising a computer readable storage medium having program instructions embodied therewith, wherein the computer readable storage medium is not a transitory signal per se, the program instructions executable by a processor to cause the processor to perform a method comprising:

identifying, by the processor, one or more unused portions of a neurosynaptic network; and for each of the one or more unused portions of the neurosynaptic network, disconnecting, by the processor, the unused portion from the neurosynaptic network.

2. The computer program product of claim 1, wherein each of the one or more unused portions comprises one of an unused neuron and an unused axon.

3. The computer program product of claim 2, wherein an unused neuron comprises a neuron that cannot affect an output of the neurosynaptic network, and an unused axon comprises an axon that cannot affect the output of the neurosynaptic network.

4. The computer program product of claim 2, wherein identifying the one or more unused portions of the neurosynaptic network includes:

scanning the neurosynaptic network to identify the unused neurons and the unused axons; and adding the identified unused neurons and the identified unused axons to a queue.

5. The computer program product of claim 4, wherein, for each unused portion in the queue, disconnecting the unused portion from the neurosynaptic network includes disconnecting the unused portion from at least one of a source, a destination, a connection, and a crossbar.

6. The computer program product of claim 2, further comprising, after disconnecting each of the one or more unused portions from the neuro synaptic network:

identifying, by the processor, one or more additional unused portions of the neurosynaptic network; and for each of the one or more additional unused portions of the neurosynaptic network, disconnecting, by the processor, the additional unused portion from the neurosynaptic network.

7. A system, comprising:

a processor; and logic integrated with the processor, executable by the processor, or integrated with and executable by the processor, the logic being configured to:

identify one or more unused portions of a neurosynaptic network; and for each of the one or more unused portions of the neurosynaptic network, disconnect the unused portion from the neurosynaptic network.

8. The system of claim 7, wherein each of the one or more unused portions comprises one of an unused neuron and an unused axon.

9. The system of claim 8, wherein an unused neuron comprises a neuron that cannot affect an output of the neurosynaptic network, and an unused axon comprises an axon that cannot affect the output of the neurosynaptic network.

10. The system of claim 8, wherein identifying the one or more unused portions of the neurosynaptic network includes:

scanning the neurosynaptic network to identify the unused neurons and the unused axons; and adding the identified unused neurons and the identified unused axons to a queue.

11. The system of claim 10, wherein, for each unused portion in the queue, disconnecting the unused portion from the neurosynaptic network includes disconnecting the unused portion from at least one of a source, a destination, a connection, and a crossbar.

12. The system of claim 8, where the logic is further configured to, after disconnecting each of the one or more unused portions from the neuro synaptic network:

identify one or more additional unused portions of the neurosynaptic network; and for each of the one or more additional unused portions of the neurosynaptic network, disconnect the additional unused portion from the neurosynaptic network.

13. A computer program product for optimizing core utilization in a neurosynaptic network, the computer program product comprising a computer readable storage medium having program instructions embodied therewith, wherein the computer readable storage medium is not a transitory signal per se, the program instructions executable by a processor to cause the processor to perform a method comprising:

identifying, by the processor, independent blocks of a first plurality of cores of a neurosynaptic network; and reconfiguring, by the processor, the independent blocks onto the first plurality of cores by calculating a new mapping for at least one of the independent blocks, and moving, by the processor, the at least one of the independent blocks to a new location on a different core of the first plurality of cores of the neurosynaptic network in accordance with the new mapping.

14. The computer program product of claim 13, further comprising updating block-to-block connectivity for each of the at least one of the independent blocks moved to a new location.

15. The computer program product of claim 13, wherein the neurosynaptic network further comprises a second plurality of cores, wherein all cores of the first plurality of cores have a same first property, and all cores of the second plurality of cores have a same second property, wherein the first property is different than the second property.

16. The computer program product of claim 15, wherein the first property includes a first time scale, and the second property includes a second time scale.

17. The computer program product of claim 13, wherein identifying the independent blocks of the first plurality of cores includes identifying only moveable independent blocks of the first plurality of cores, such that unmovable independent blocks of the first plurality of cores are not reconfigured.

18. The computer program product of claim 13, wherein the first plurality of cores includes cores of different sizes.

19. The computer program product of claim 18, wherein a cost function is utilized for reconfiguring the independent blocks onto the first plurality of cores.

20. The computer program product of claim 19, wherein the cost function is minimized.

* * * * *